Feb. 10, 1970  F. R. DICKEY, JR  3,495,242

AUTOMATIC CORRELATION CIRCUITS

Filed Dec. 29, 1959  4 Sheets-Sheet 1

INVENTOR:
FRANK R. DICKEY, JR.
BY Marvin A. Goldenberg
HIS ATTORNEY.

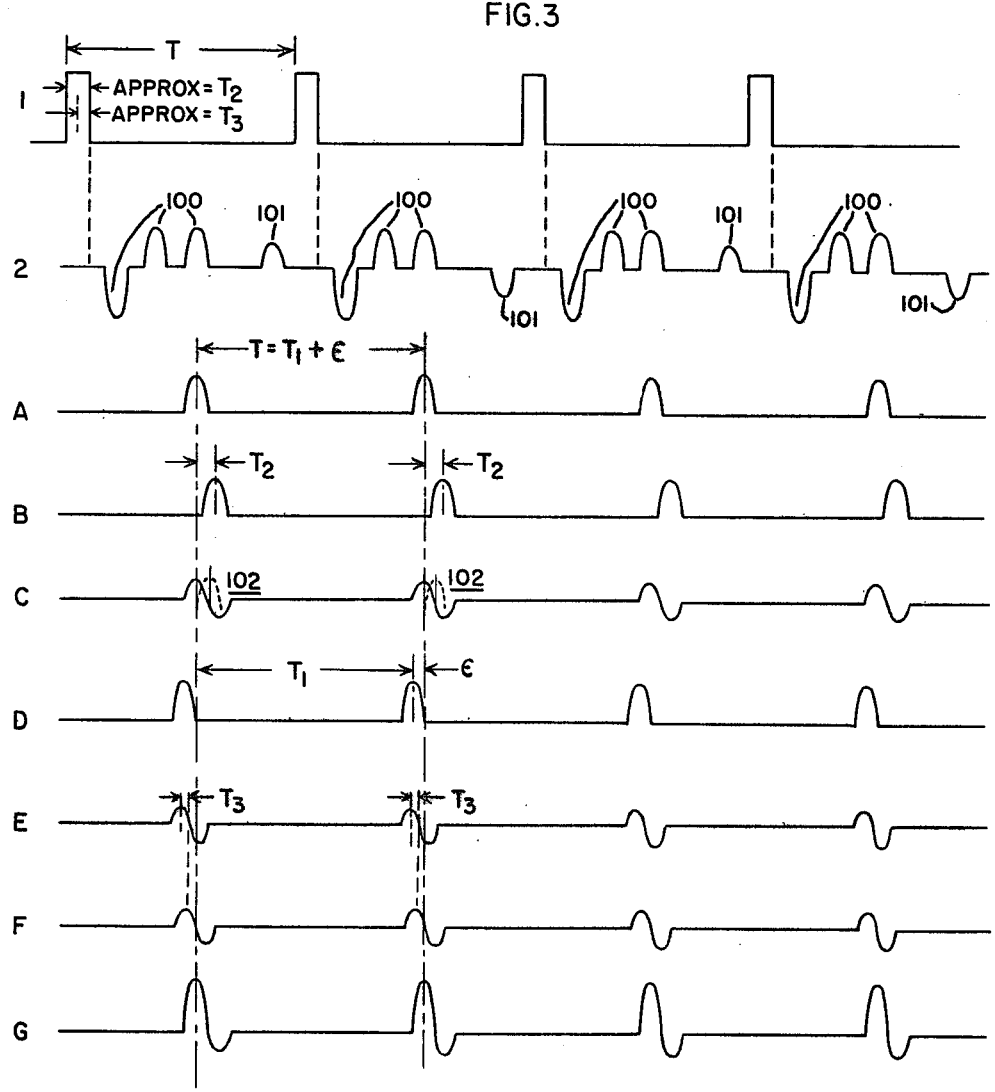
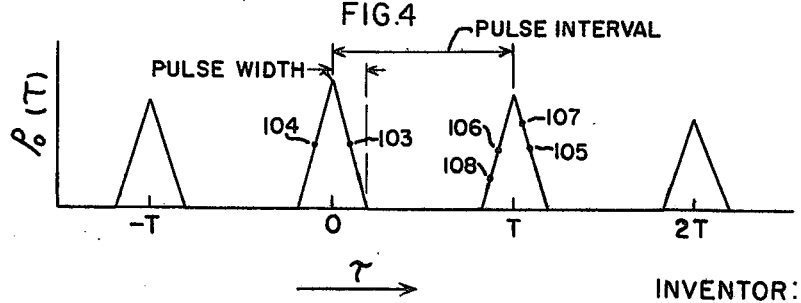

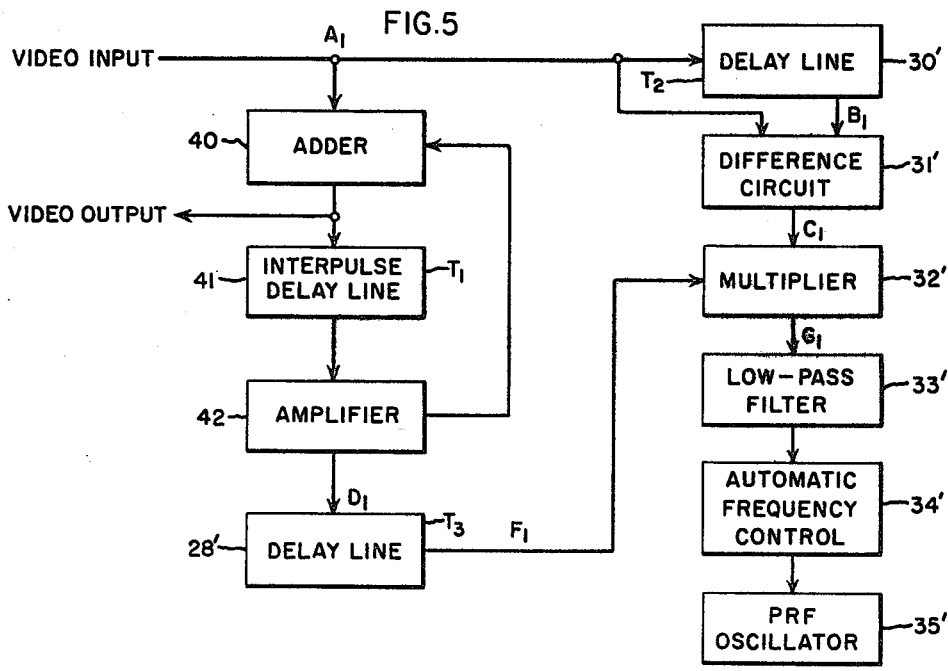
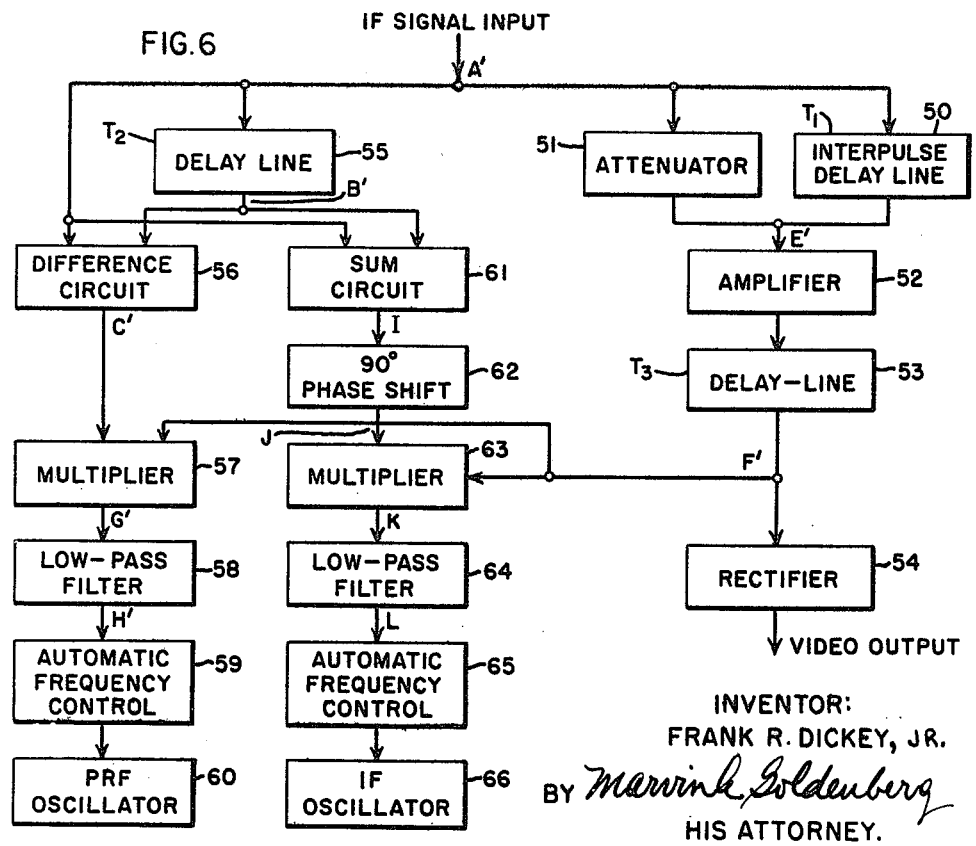
INVENTOR:
FRANK R. DICKEY, JR.
BY Marvin R. Goldenberg
HIS ATTORNEY.

Feb. 10, 1970  F. R. DICKEY, JR  3,495,242
AUTOMATIC CORRELATION CIRCUITS
Filed Dec. 29, 1959  4 Sheets-Sheet 4
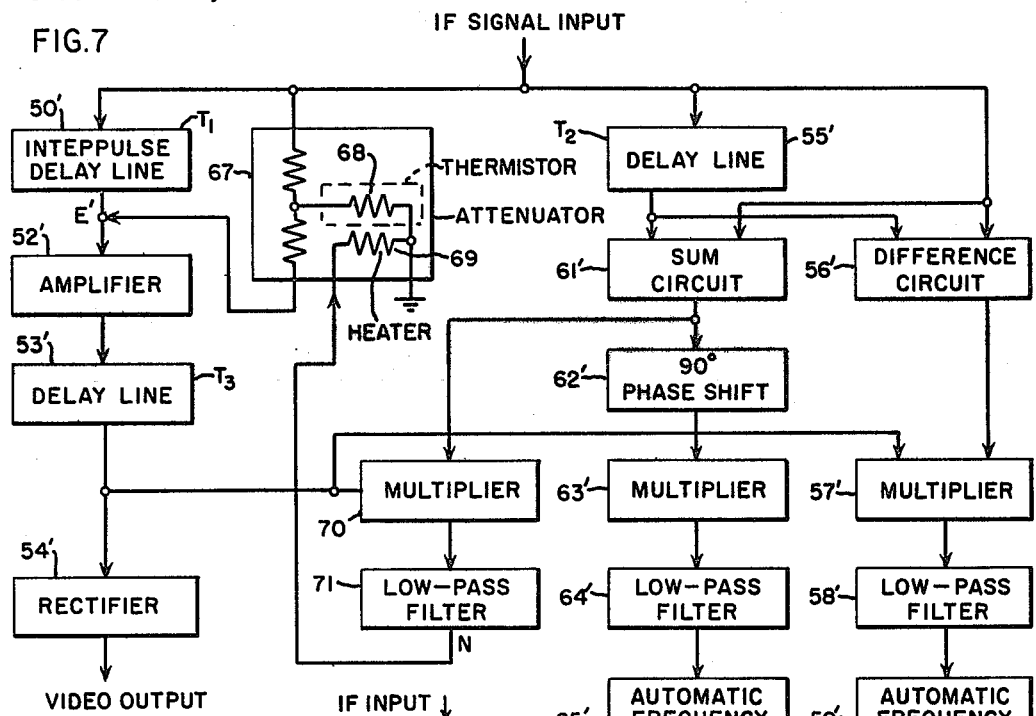
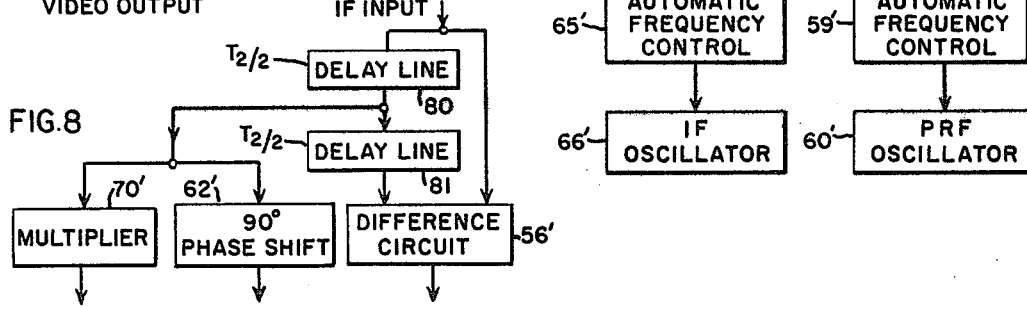
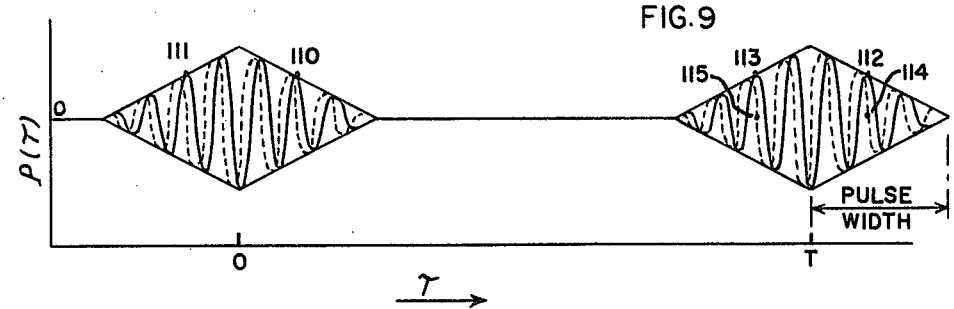
INVENTOR:
FRANK R. DICKEY, JR.
BY Marvin L. Goldenberg
HIS ATTORNEY 3,495,242
AUTOMATIC CORRELATION CIRCUITS
Frank R. Dickey, Jr., De Witt, N.Y., assignor to General
Electric Company, a corporation of New York
Filed Dec. 29, 1959, Ser. No. 862,556
Int. Cl. G01s 9/42
U.S. Cl. 343—7.7                                    22 Claims This invention relates to automatic correlation circuits having principal application to radar systems, and more particularly to novel automatic frequency control and automatic gain control circuits in radar MTI systems.

Moving target indication (MTI) systems present the signals received by a pulse radar set in such a way that moving targets appear on a PPI scope while stationary targets, or ground clutter, are cancelled out and give no response. The Doppler effect is resorted to in distinguishing the moving targets from the stationary ones, the echo pulses from the stationary targets being on a fixed frequency while the echo pulses from the moving targets are shifted in frequency. In conventional MTI systems cancellation occurs at the video frequency, the video signals being derived from a synchronous demodulator. The echo pulses of fixed IF frequency from each stationary target are demodulated and form pulses of constant amplitude, and the echo pulses of shifted IF frequency from each moving target are demodulated and form pulses of variable amplitude, the amplitude having values which follow the Doppler frequency waveform. By comparing successive sweeps having stationary and moving target pulses, accomplished by delaying each sweep relative to a succeeding sweep, and subtracting the delayed from the undelayed sweep, the stationary target pulses can be eliminated and only the moving target pulses remain. In order to accomplish effective cancellation of the stationary target pulses, it is necessary to provide means for automatically controlling the pulse repetition frequency to such value that the interpulse period coincides with the time delay between the delayed and undelayed sweep. Recently, IF cancellation has been introduced in MTI systems, wherein cancellation ocurs at the intermediate frequency. For effective cancellation in such systems it is necessary to control the IF in addition to making the PRF period equal to the delay.

It is also necessary to control the PRF in delay line video integrators, which are employed for example in conventional search radar systems other than MTI. These integrators make possible the building up of the received video signals by adding the pulses of sucessive video sweeps, the sweeps being delayed with respect to each other. In order to obtain maximum enhancement of the combined signals, the PRF must be precisely matched to the delay line so that the pulses of successive sweeps add in phase.

There are several known methods for maintaining the PRF period equal to the delayed period, all of which require the transmisison through a delay channel of a control signal, normally a pulse, specifically utilized for the purpose of providing this equality. In one method a control pulse is transmitted from a blocking oscillator through the signal channel delay line and back to the oscillator, the control circuit also including modulator, demodulator and amplifier components. This necessitates some form of multiplexing, such as time gating, amplitude selection, or frequency selection in order to separate the control pulse from the recevied signal pulses. In addition, there is a delay error introduced in the components of the control circuit, e.g., in the time required for triggering the blocking oscillator by the returning control pulse. This delay is difficult to compensate for.

Another common method for maintaining the PRF period equal to the delay period is to transmit a control pulse through a delay line other than the signal channel delay line, which must provide the same delay as that of the signal channel. Although this method avoids the problem of multiplexing, it presents an additional error possibility in that it is difficult to match the delay line of the control channel with the delay line of the signal channel.

Still another method is the transmission of a signal from a pulse generator of controllable repetition frequency through a delay channel, which can be the signal channel, and through a parallel undelayed channel. An early gate is provided in one channel and a late gate in the other, the closing of the early gate and opening of the late gate being coincidental. The signals from the two channels are summed to provide a frequency control for the pulse generator.

A known method for controlling the IF local oscillator in an IF cancellation system is to gate a burst from the IF oscillator output through the signal channel delay line. The phase of the burst signal at the delay line output is compared with the phase of the IF oscillator in a phase detector, and any difference therebetween produces an error signal which is fed back to control the frequency of the IF oscillator. In addition to the limitations outlined for the prior art PRF control circuits, this system is subject to spurious responses from the delay line, which effect increases as the length of the burst increases.

Accordingly, it is a primary object of the invention to provide novel and improved correlation control circuits for use in a radar system.

It is a further object of the invention to provide in a radar system novel and improved correlation control circuits which utilize stationary target return to supply the control signals.

It is another object of the invention to provide in a radar MTI system a new and improved form of automatic frequency control and automatic gain control which utilizes stationary target return to supply control signals for maintaining correlation between the delayed and undelayed signals in the cancellation circuit of said radar system.

It is another object of the invention to provide for use in the video delay line integrator of a radar system novel and improved correlation control circuits utilizing stationary target return to control the correlation of the delayed and undelayed pulses which are combined in said integrator.

Briefly, in accordance with one aspect of the invention, an automatic correlation control circuit is provided for use in a radar MTI cancellation system in which a received input signal is delayed in a long delay line and subtracted from an undelayed received input signal for cancellation of the fixed target signals. Applicant's novel correlation control circuit adjusts the interpulse period (i.e., the PRF rate) so as to make it identical to the long delay, and thus achieve a cancellation which is continuously being corrected for variations in the period of the long time delay. The control circuit comprises a short delay line for imparting to the delayed input signal an additional delay, usually equal to one half the transmitted pulse width, the output of the short delay line being coupled as a first input to a multiplier circuit. The undelayed received input signal is further coupled to a second short delay line for imparting a delay of twice said additional delay, and the output of the second short delay line and the undelayed signal are subtracted. The difference signal resulting is coupled as a second input to the multiplier circuit. The product output of the multiplier circuit is coupled through a low-pass filter which integrates the product output and provides a D-C control signal of appropriate polarity to the pulse repetition oscillator to maintain the transmitted interpulse period equal to the delay of the long delay line.

In accordance with a further aspect of the invention an IF control circuit is provided for use in a radar MTI system providing cancellation at the intermediate frequency. In this system, in addition to the continuous PRF adjustment discussed above, the IF oscillator is continuously adjusted so that an odd number of half periods of the intermediate frequency are equal to the delay of the long delay line. The correlation correction circuit includes means by which the output of the second short delay line is added in a summation circuit to the undelayed received input signal and the output of the summation circuit is coupled through a 90° phase shifter to the input of a second multiplier circuit as a second input, the first input to said second multiplier circuit being coupled as before from the first recited short delay line. The product output of said second multiplier is integrated in a second low-pass filter and connected as a second control signal to the intermediate frequency oscillator to maintain the frequency thereof at the optimum value.

In accordance with another aspect of the invention an automatic gain control circuit is provided in a radar MTI system, such as those noted above, wherein a variable attenuation network is connected in the cancellation circuit which is continuously adjusted to attenuate the undelayed signal by an amount equal to the attenuation imparted by the long delay line. The output of the summation circuit is coupled as a second input to a third multiplier, the first input being coupled from the first recited short delay line. The product output of said third multiplier is integrated in a third low-pass filter and connected as a third control signal to said variable attenuator to maintain the attenuation at equality with the delay line attenuation.

In accordance with yet another aspect of the invention the PRF control circuit is adapted for use in a video delay line integrator in a search radar system to maintain the transmitted interpulse period equal to the delay time of the delay line contained in the integrator.

In contrast to the prior art, applicant, by employing the above outlined correlation control circuits, has provided a system in which the stationary target return, which can be ground clutter or sea return, is used for PRF and IF control, thus, eliminating the need for a special control pulse and providing a simple and accurate system. In addition, the spurious responses obtained in the prior art IF oscillator control circuitry are lessened considerably as a result of the randomness of the polarity of the fixed target pulses. Applicant also utilizes the ground clutter to obtain an AGC of the delayed and undelayed echo signals to provide an improved cancellation of the fixed target signals.

While the specification concludes with the claims particularly pointing out and distinctly claiming the subject matter which applicant regards as his invention, the invention itself both as to its organization and method of operation, together with further objects and advantages thereof, is best understood by reference to the following description when taken in connection with the accompanying drawings wherein:

FIGURE 3 is a series of graphs illustrating the voltage waveforms at various points in FIGURE 2;

FIGURE 4 is a plot of the autocorrelation function descriptive of the video input signals of the video cancellation circuit in FIGURE 2;

FIGURE 5 is a block diagram of a delay line video integrator employing applicant's video cancellation control circuit;

FIGURE 6 is a block diagram of another embodiment of applicant's correlation control circuitry which is employed with an IF cancellation in a radar MTI system;

FIGURE 7 is a block diagram of a further embodiment of applicant's IF cancellation circuit additionally illustrating an automatic gain control;

FIGURE 8 is a block diagram of an alternative arrangement of the delay channel of applicant's control circuit which may be employed in the systems of FIGURES 6 and 7; and FIGURE 9 is a plot of the autocorrelation function descriptive of the IF input signals of the IF cancellation circuits in FIGURES 6 and 7.

Figure 1:
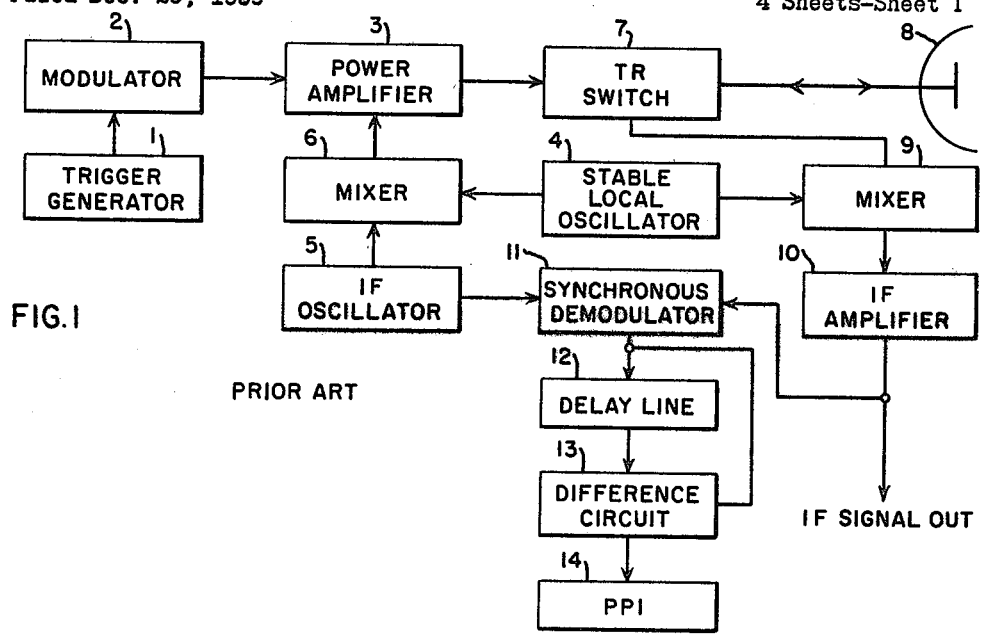
FIGURE 1 illustrates in block diagram form a conventional radar MTI system to which applicant's novel correlation control circuitry may be applied.

Referring now to the drawings, in FIGURE 1 there is shown in block diagram form a conventional radar MTI system employing video cancellation but which may readily be adapted for IF cancellation. This represents a typical system of the prior art, and is similar to those found in the Radiation Laboratory Series of the Massachusetts Institute of Technology, vol. 1. The figure is simplified for ease in understanding. Applicant's invention has application to it as well as to numerous other forms of conventional radar MTI systems. A trigger generator 1, which may be in the form of a triggered blocking oscillator of a frequency in the range of 300 to 1000 cycles, excites a modulator 2 which in turn pulse modulates the RF energy in a high power amplifier 3, such as a high power klystron, to form pulses of 1 to 10 microseconds duration. The output of a stable local oscillator 4, which may be in the form of a low power klystron tuned to a frequency of 3000 mc., is heterodyned in the mixer 6 with the energy of an IF oscillator 5, which may be tuned to a frequency of 60 mc., for supplying the RF energy at a frequency of 3060 mc. to the high power amplifier 3. The output of the power amplifier 3 is connected through a TR switch 7 to the antenna 8, thereby transmitting a pulsed RF wave. The output of the stable local oscillator 4 is also used to heterodyne the received signal pulses which are coupled from the TR switch in a second mixer 9 at the receiver input. Thus, the RF echo signals are beat down to a frequency of 60 mc. and connected to the receiver IF amplifier 10. The received signals in the IF amplifier 10 comprise signals from stationary targets which are of constant frequency and phase, and signals from moving targets which are shifted in frequency and phase as a result of the Doppler effect. The output of the IF amplifier 10 is connected to a synchronous demodulator 11 together with another output taken from the IF oscillator. The synchronous demodulator, well known in the art, compares the phase of the IF oscillator with the phase of the IF received signals and provides a detected output, the amplitude of which is a function of the phase relationship of the input signals. Thus, the synchronous demodulator output comprises a train of pulses, those from each stationary target having a relatively constant amplitude from pulse to pulse and those from each moving target having a variable amplitude from pulse to pulse, which amplitude varies as the Doppler frequency.

The detected video signals are split into two channels, one of which contains an ultrasonic delay line 12, the other providing no delay, and are then combined in a difference circuit 13 for cancellation of the fixed target signals. Since delay lines having the desired amount of delay are not readily available for use at the video frequencies, the video signals, before traversing the delay line, must be modulated on a carrier, such as a 15 mc. wave, at which frequency it may be readily delayed. It is then amplified and demodulated. This is shown more clearly in FIGURE 2. The ultrasonic delay line optimumly applies a delay equal to the interpulse period of the transmitted pulses. Therefore, when the video pulses of a single sweep are subtracted from the preceding group of pulses which have been delayed exactly an interpulse period, the stationary targets being of constant amplitude will cancel to zero, or a negligible value, and only the moving targets will provide a response. The cancelled signal comprising only the moving target pulses is then rectified not shown) and displayed on a PPI scope 14.

With the system adapted for IF cancellation in lieu of video cancellation, the cancellation circuit is coupled to the IF amplifier output. This circuit is substantially the same as the video cancellation circuit except that it is operative in the intermediate frequency range.

In order to obtain effective cancellation of the stationary target signals, it is necessary that the delay imposed by the ultrasonic delay line 12 be exactly equal, or nearly so, to the interpulse period of the PRF frequency of the trigger or PRF oscillator 1. Since the ultrasonic delay line is subject to temperature variations, a control must be applied to either the delay line or to the PRF oscillator to maintain the requisite relationship between the two, it being conventional to exert the control upon the PRF oscillator. In IF cancellation systems, it is additionally necessary to control the intermediate frequency. Conventional control circuits for both PRF and IF oscillator control utilize a specific control signal and are subject to a number of limitations as previously mentioned. The following novel control circuits utilize ground clutter or sea return for providing the requisite control and dispense with the need for the specific control signals of the prior art.

Figure 2:
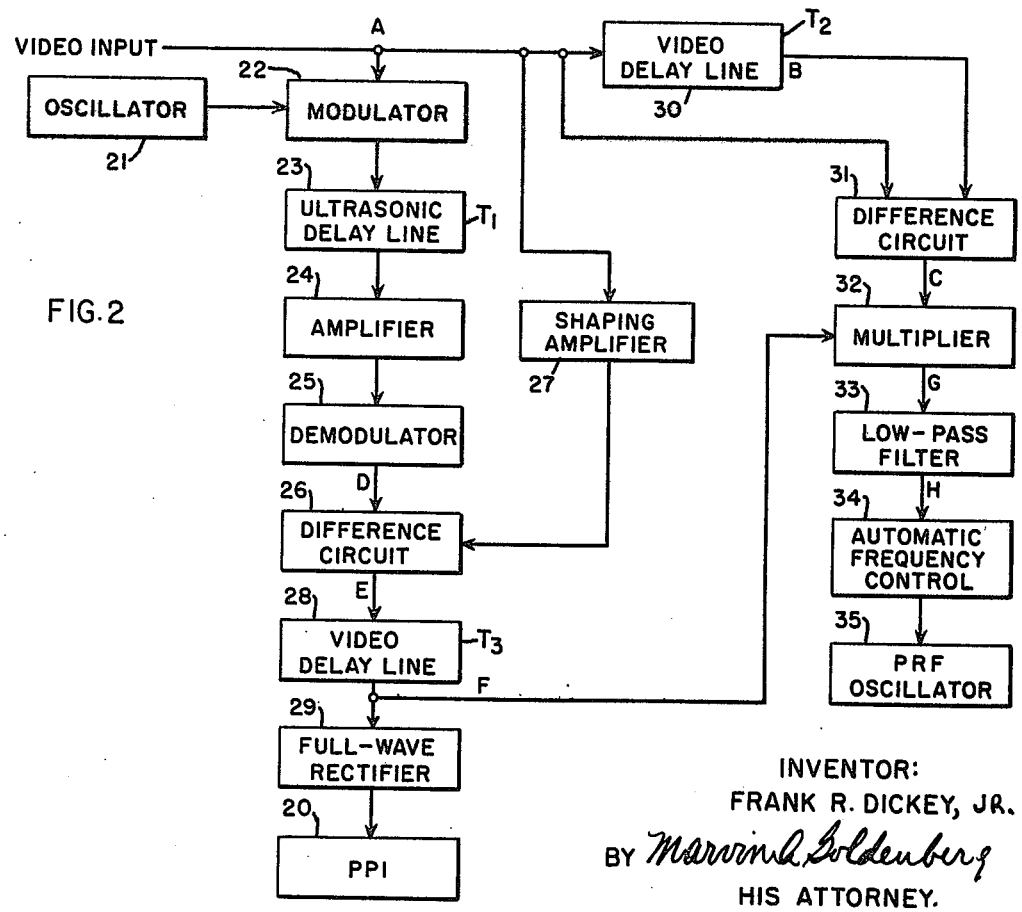
FIGURE 2 is a block diagram of one embodiment of applicant's correlation control circuitry which is applicable to video cancellation in a radar MTI system.

In FIGURE 2 there is shown a block diagram of a portion of a video cancellation radar MTI system employing applicant's PRF control circuit. The control circuit illustrated can be employed with the system of FIGURE 1, the output of the synchronous demodulator 11 in FIGURE 1 corresponding to point A in FIGURE 2. In employing applicant's PRF control circuitry, radar ground clutter or sea return is utilized to obtain automatic frequency control of the PRF oscillator. In the instance where the radar set is mounted on a moving platform or object, either a non-coherent form of MTI must be employed or a coherent MTI which has compensation circuitry to automatically compensate for such motion.

Except for the insertion of delay line 28 necessary for the control circuit operation, a conventional cancellation circuit, somewhat greater detailed than in FIGURE 1, is shown by the elements 21 to 29 connecting a video signal to a PPI scope 20. This circuit includes a carrier oscillator 21 of approximately 15 mc. which is modulated by the video input signal in modulator 22. An ultrasonic delay line 23 delays the modulated signal by a time $T_1$, which is maintained equal to the interpulse period T of the transmitted wave. The ultrasonic delay line may be one of the types illustrated in the Radiation Laboratory Series of the Massachusetts Institute of Technology, vol. 1, on pages 667 to 672. The delayed modulated signal is then coupled through amplifier 24 and demodulated in demodulator 25. A difference circuit 26 subtracts the delayed signal from the undelayed signal which is connected to the difference circuit through shaping amplifier 27, which compensates for any distortion in the delayed channel so that the delayed and undelayed pulses are of similar form. Delay line 28 provides a short time delay $T_3$ in the difference signal of approximately one half the pulse width. This delay is necessary only for the operation of applicant's novel PRF control, as will be presently understood, and does not otherwise interfere with the operation of the cancellation circuit. The signal is finally connected from delay line 28 to the PPI scope by a full wave rectifier 29 which provides video pulses all of the same polarity.

The PRF control circuit comprises a video delay line 30 which imparts a short time delay $T_2$ of the input video pulse signal (equal to precisely twice the delay $T_3$ for reasons to be indicated below). A second difference circuit 31 subtracts this delayed signal from the undelayed video pulse signal and the difference is connected to a multiplier circuit 32, to which is also connected the output of delay line 28. A suitable multiplier circuit that may be employed is a conventional balanced modulator of a type having a D-C output, such as disclosed in Engineering Electronics, first edition, 1957, John D. Ryder, on page 250. The multiplier output is connected to a lowpass filter 33 having a long time constant which provides an integration of the product signal from the multiplier. This integrated signal is connected as the control signal to the automatic frequency control circuit 34 which controls the PRF oscillator 35 to provide a pulse signal output having an interpulse period equal to the delay time $T_1$. It is noted that the cancellation circuit illustrated is of the amplitude modulation type. However, applicant's novel control circuit is equally applicable to frequency modulation video cancellation systems.

In describing the operation of the system of FIGURE 2, the gain in the respective delayed and undelayed channels at the difference circuits 26, 31 is considered to be substantially equal. The transmitter trigger pulse is shown in graph 1 of FIGURE 3, the interpulse period being designated as T and the periods $T_2$ and $T_3$ being graphically illustrated as respectively approximately equal to and approximately equal to one half the transmitted pulse duration for usual operation. For purposes of clarity, the time base is distorted in illustrating the relation between pulse repetition rate and pulse duration. The voltage waveform of the video input signal appearing at point A is shown in graph 2 referenced in time to the trigger pulses of graph 1. Graph 2 demonstrates the fixed target pulses 100 to be each of constant amplitude and polarity and the moving target pulses 101 to be of varying amplitude and polarity. Only the fixed target pulses are utilized in providing the PRF control. Signals from the moving targets and noise pulses, which are of random amplitude from pulse to pulse, average to a negligible value and essentially will have no D-C component at the filter output. For simplicity we will consider only the pulses from one fixed target, shown in graph A, which have a positive polarity. Signals having an opposite phase at the receiving antenna would produce inverted pulses at point A. However, the operation of the system is independent of the pulse polarity. As previously indicated, for optimum operation the waveform of graph 9 should have an interpulse period equal to the delay $T_1$ of the ultrasonic delay line. However, for explanatory purposes, we will assume an interpulse period of $T_1+\epsilon$, where $\epsilon$ is a delay or timing error.

The voltage waveform appearing at point B is shown in graph B, wherein the pulse is delayed by a period, $T_2$, equal to approximately the pulse width. The waveform at point B is subtracted from that at point A and appears at point C, as shown in graph C, as a symmetrical positive and negative going signal. It is noted that a negative going pulse at point A would produce an inverted signal at point C to the one shown. The signal appearing at point D is shown in graph D wherein the pulses of graph A are shown shifted to the right approximately one pulse interval, being delayed by a time precisely equal to $T_1$. The pulsed waveform at point A is subtracted from the pulsed waveform at point D and appears at point E as shown in graph E. For optimum operation, the difference voltage at point E, arising from fixed target pulses, is equal to zero. With the assumed PRF error, however, the waveform at point E is shown as a positive and negative going signal. The signal at point F indicated in graph F, is the signal of point E delayed by a time equal to approximately one half of the pulse width. At point G there is obtained the product of the difference signals at points F and C. This may be expressed as the difference of the product terms: (C) (D delayed by $T_3$), and (C) (A delayed by $T_3$). The delay $T_3$ of the signal of graph A is such as to make it symmetrical about the signal of graph C, i.e., the peak of A occurs at the central zero crossing of C at the multiplier input, is shown in dotted waveform at 102. Thus, the product (C) (A delayed by $T_3$) will always have an average zero value and the correction signal is obtained solely from the product (C) (D delayed by $T_3$), shown in graph G. If the pulses at D do not correspond in position to the pulses at A, the product (C) (D delayed by $T_3$) will have an average positive (or negative) D-C value appearing at the output of the low-pass filter, dependent upon the magnitude and sign of the timing error $\epsilon$. Thus for the error assumed, this product has a positive D-C component, which is applied to the automatic frequency control unit of the PRF oscillator as a servo control signal to reduce the error $\epsilon$ to zero.

The operation of the PRF control circuit of FIGURE 1 may be conveniently analyzed in terms of the autocorrelation function of simplified video signals assumed to be a succession of evenly spaced, equal duration rectangular pulses. It is noted that the autocorrelation function of $e(t)$, the video input signal, is defined as:

$$\rho_o(\tau) = \lim_{T_L \to \infty} (1/2T_L) \int_{-T_L}^{T_L} e(t+\tau)e(t)dt \quad (1)$$

where $\pm T_L$ are arbitrarily assigned limits of integration and $\tau$ is the delay between correlated waves, treated as an independent variable.

FIGURE 4 shows a graph of the autocorrelation function $\rho_o(\tau)$ of the video input signals of point A versus the time lag $\tau$. It is seen that $\rho_o(\tau)$ has the greatest maximum value at $\tau=0$, and descending maximum values at integral multiples of T, the interpulse period. For values of $\tau$ to either side of the maximum points equal to the pulse width, $\rho_o(\tau)$ is seen to be zero. Thus, if one imagines the video input waveform as compared to itself slowly slipping by as the value of $\tau$ changes, the autocorrelation function appears as in FIGURE 4, the maximum points occurring when the pulses of the two waveforms are in alignment or congruent and the minimum portion occurring when there is no congruence of the pulses. The maximum points have different values since the repeated target pulses are not of precisely constant amplitude.

Denoting the voltage appearing at point A of FIGURE 2 as a function of time, $e(t)$, the voltage at point B may be expressed as $e(t-T_2)$ and the voltage at point C as $e(t)-e(t-T_2)$. The voltage at point D may be denoted as $e(t-T_1)$, the voltage at point E as $e(t-T_1)-e(t)$, and the voltage at point F as $e(t-T_1-T_3)-e(t-T_3)$. The voltage at point G is equal to the product of the voltages at points C and F and may be expressed as $e(t) \cdot e(t-T_1-T_3) - e(t-T_2) \cdot e(t-T_1-T_3)$
$\qquad -e(t) \cdot e(t-T_3) + e(t-T_2) \cdot e(t-T_3).$ It is noted that this term is composed of four product terms, each of which may be time averaged or integrated and expressed as an autocorrelation coefficient. Thus, the voltage at point H may be expressed as:

$$V_H = \rho_o(T_1+T_3) - \rho_o(T_1+T_3-T_2) \\ -\rho_o(T_3) + \rho_o(T_3-T_2) \quad (2)$$

When the interpulse period T of the PRF oscillator is exactly equal to the delay $T_1$, by a judicious selection of the values of $T_2$ and $T_3$, the four terms can be made to add to zero, $T_2$ being no greater than twice the pulse width and $T_3$ being equal to precisely $T_2/2$. For an optimum range of control, $T_2$ should be set equal to the pulse width. Thus, for zero error, $\epsilon$, $\rho_o(T_3)$ is indicated in FIGURE 4 at point 103, $\rho_o(T_3-T_2)$ at point 104, $\rho_o(T_1+T_3)$ at point 105 and $\rho_o(T_1+T_3-T_2)$ at point 106. These four quantities add to zero in expression (2) and provide a control voltage of zero at point H. Assuming now an error $\epsilon$ between $T_1$ and the interpulse period, wherein T exceeds $T_1$, points 103 and 104 will be situated as before, but $\rho_o(T_1+T_3)$ will be at point 107 and $\rho_o(T_1+T_3-T_2)$ will be at point 108. Hence, the four quantities will not add to zero in expression (2) and will produce a D-C control voltage at point H of such magnitude and sign as to correct T to match the delay $T_1$. When this occurs, the voltage at H is returned to zero. It is noted that in the previous analysis the assumed error $\epsilon$ yields a positive control voltage. An error in the opposite direction, where T is less than $T_1$, would shift points 105 and 106 to the right and provide a negative control voltage.

Since the control signal is provided by only the fixed targets, it may be desirable in the interest of greater accuracy to exclude some of the moving target signals, for example, by gating at the multiplier output or at one input to the multiplier. The gate should be set so as to pass only close range signals where ground clutter predominates and moving targets are few. Additionally, it may be desirable to insert high pass filters, or differentiating circuits, plus symmetrical limiters in each of the input circuits to the multiplier, e.g., between the multiplier and points F and C to impart symmetry between the positive and negative halves of the input difference signals. The magnitude of the control voltages is thereby made independent of the strength of the received target signals.

Referring now to FIGURE 5, there is illustrated in block diagram form a further application of applicant's PRF control circuit, to a conventional delay line video integrator which is commonly employed in numerous search radar systems. Such delay line video integrator, and other comparable ones, are disclosed in an article by R. W. Roop, entitled, "Delay Lines in Military Data Systems," in Military Systems Design, September–October, 1959, published by Instruments Publishing Company. The purpose of the video intergator is to improve the signal to noise ratio of the video input signal and suppress interference from other radar systems by adding the pulses of successive sweeps. The circuit essentially comprises an adder 40 coupled to a delay line 41, which imparts a delay of $T_1$ equal to the interpulse period T, or integrally related thereto, and an amplifier 42 coupled to the output of the delay line. For simplicity the modulator and demodulator circuits normally associated with delay line 41 are omitted. The output of amplifier 42 is coupled back to the adder through a closed path which is adjusted to provide a signal gain of less than unity for perfecting the integration process.

The PRF oscillator 35' is adjusted by a control circuit identical in construction and operation to the one illustrated in FIGURE 2 so that $T=T_1$, common components being designated by a prime notation. Thus, a second output of amplifier 42, which corresponds to the signal at point D in FIGURE 2, is delayed by $T_3$ and multiplied by the difference signal from circuit 31', corresponding to the signal at point C in FIGURE 2, to provide the difference of two autocorrelation coefficients at the output of filter 33', which is the PRF control signal.

In FIGURE 6 there is shown another embodiment of applicant's invention wherein cancellation is performed at the IF stage rather than the video stage. The term "IF" is here used to mean an "intermediate frequency" intermediate to that of the carrier, upon which the pulses are modulated, and the "video" frequency. The "video" is the electrical signal descriptive of radar environment, and contains a large number of randomly spaced returns, some essentially faithful reproductions of the transmitted pulse, and others rather random combinations thereof. In order to reproduce this video signal for, let us say, visual plan position indicator (PPI) display, a bandwidth in the range of 5 megacycles is usual. The intermediate frequency is thus usually selected to be several times that of the video bandwidth for ease in amplification in bandpass amplifiers.

By cancelling at the IF, visibility of the moving targets with respect to the ground clutter residue is improved. The detected video moving target signal has a greater average value since an amplitude detector can be employed to obtain the video signal rather than a synchronous demodulator. A block diagram is illustrated of a portion of an IF cancellation MTI system employing applicant's PRF and IF local oscillator control circuits. As with the system of FIGURE 2, ground clutter is utilized to obtain the respective AFC signals. In the case of FIGURE 6, two electrical servos are activated by the ground clutter signals. One servo controls the PRF, while the other controls the IF frequency so that the delayed and undelayed signals from a fixed target are exactly 180 degrees out of phase at the IF frequency at the point where they are combined. The correlation control circuits shown are applicable to existing coherent type MTI systems such as illustrated in FIGURE 1.

Applicant's control circuits for IF cancellation systems are also applicable to systems such as disclosed in the Radiation Laboratory Series, vol. 1, previously referred to, which employ a step locked type of IF oscillator control, i.e., the coherent oscillator is restarted periodically in phase with the transmitter. Such systems, however, need to be modified to include a controllable continuous wave oscillator, which is the type necessary for applicant's control circuit. Such CW oscillator may be readily introduced by adding an additional mixing stage. For example, in the circuit of FIGURE 16·13(a) of said Radiation Laboratory Series volume, a mixer may be inserted in the path connecting the coherent IF oscillator and the receiver, and a controllable CW oscillator connected to said additional mixer to beat with the reference signal from the coherent oscillator for providing a new reference signal to said receiver. Thus assuming a 60 mc. reference signal from the coherent IF oscillator and a 60 mc. IF received signal normally being fed to the receiver, a 40 mc. controllable CW oscillator will produce a new reference signal of 100 mc., which when combined in the receiver with the 60 mc. received IF signal provides a second IF signal of 40 mc. This may then be synchronously demodulated when beat with the output of the controllable oscillator.

An important additional advantage of performing ground clutter correlation control at the IF is that in the case of shipborne or airborne radars, the Doppler shift produced by platform motion is compensated for automatically. The IF oscillator will shift frequency by an amount equal and opposite to the average Doppler shift of the sea or ground return so that the frequency applied to the delay line is correct for cancellation.

The conventional portions of a cancellation circuit in FIGURE 6 include an ultrasonic interpulse delay line 50, imparting a delay $T_1$, and an attenuator 51, the input of which may be coupled from the output of the IF amplifier 10 in FIGURE 1. For perfect cancellation of the IF fixed target signal, $T_1$, in addition to matching the interpulse period of the PRF oscillator, must be made equal to an odd number of half periods of the intermediate frequency. Thus, the PRF is adjusted so that $$T_1 = \frac{1}{PRF}$$

and the IF is adjusted so that $$T_1 = \frac{M + \frac{1}{2}}{f}$$

where M is an integer usually having a value of 5000 to 30,000 and $f$ is the intermediate frequency. It is noted that the delay line may be of the type having one of two transducers designed to invert the phase of the signal, in which case the delay is $M/f$. With these relationships satisfied, the combined signals of the fixed targets passed through delay line 50 and the attenuator 51 cancel to zero and only the moving target signals remain. The combined signals after being delayed and amplified by the amplifier 52 and delay line 53 (the latter providing a delay $T_3$ necessary only for operation of the control circuits) are rectified by the rectifier 54 and connected to a PPI scope (not shown).

The PRF oscillator and IF local oscillator control circuits comprise a short delay line 55, which provides a delay $T_2$ of the input video pulse approximately equal to the pulse duration, $T_2$ being two times $T_3$, as in the system of FIGURE 2. An additional constraint on this delay is that $$T_2 = \frac{N}{f}$$

where N is an integer, for example, of a value 3 to 60. The frequency $f$ is adjusted to satisfy the equation $$T_1 = \frac{M + \frac{1}{2}}{f}$$

It does not then exactly satisfy the equation $$T_2 = \frac{N}{f}$$

but this equation is satisfied to within a negligibly small fraction of a cycle. This is possible because $N \ll M$. For example, for a range of variation in $f$ of ± one part in 1000, for a value $N=5$, there would be a variation in $N/f$ of ± one part in 200 which represents ±1/200 of the IF cycle delay error in $T_2$. This error will have negligible effect on the operation of the system.

The remaining components of the PRF oscillator control circuit are as in the video correlation control circuit, except for operation now at the intermediate frequency. They include a difference circuit 56 which receives the undelayed and delayed input signals and connects the difference to a multiplier circuit 57. The multiplier circuit multiplies this difference signal with a second signal from the output of delay line 53 and the product is integrated by a long time constant low-pass filter 58, from which it is connected to the automatic frequency control 59 of the PRF oscillator 60.

The IF local oscillator control circuit in addition to delay line 55 includes a summation circuit 61 which adds the undelayed and delayed input signals, the output thereof being connected to a 90° phase shifter 62. The output of the 90° phase shifter is connected to a second multiplier circuit 63 in which it is multiplied with the signal from the concellation circuit. The output of the multiplier is connected through an integrating low-pass filter 64, identical to the PRF circuit filter, to the automatic frequency control 65 of the IF local oscillator circuit 66. The IF local oscillator corresponds to the IF oscillator 5 in FIGURE 1.

In the operation of the system of FIGURE 6, the IF signal input at point A' is a pulse modulated IF wave. The input signal is delayed in delay line 50 by a time equal to the interpulse period of the PRF oscillator and also an odd number of one half periods of the IF frequency. Delay line 50 also effects some attenuation of the signal which is compensated for in the signal by the attenuator 51. The signals are then combined and appear at point E' as a cancellation signal. The undelayed and delayed signals algebraically combine when coupled together at point E', as shown, since they are fed from circuits providing attenuation. If the PRF is properly matched to delay $T_1$ and if the IF frequency is of the proper value, essentially complete cancellation of the fixed target signals results and only the moving target signals remain. They are rectified and coupled to the PPI scope.

The operation of the frequency control system is best explained by examining the autocorrelation function of the IF input signals of the stationary targets, expressed as E(T) cos $(2\pi ft + \theta)$, which hereafter we will consider as F($t$). The autocorrelation function of F($t$) then may be expressed as:

$$\rho(\tau) = \lim_{T_L \to \infty} (1/2T_L) \int_{-T_L}^{T_L} F(t+\tau)F(t)dt \quad (3)$$

which can be shown to equal 1/2 cos $2\pi f\tau \cdot \rho_0(\tau)$, where $f$ is equal to the IF and $\rho_0(\tau)$ is the autocorrelation function of the synchronously detected IF signals. The autocorrelation functions $\rho(\tau)$ is descriptive of the IF input signals at point A' versus time lag $\tau$ and is shown in FIGURE 9. It is seen that the autocorrelation function assumes a cosine waveform having an envelope corresponding to $\rho_0(\tau)$, whose plot is illustrated in FIGURE 4.

Considering once again FIGURE 6, wtih the IF input signal at point A' denoted as $F(t)$, the voltage at point F' may be expressed as $F(t-T_3)+F(t-T_1-T_3)$. The voltage at point B' may be expressed as $F(t-T_2)$, the voltage at C' as $F(t)-F(t-T_2)$, and the voltage at G' which is the product of the voltages at C' and F' as $$F(t) \cdot F(t-T_3) - F(t-T_2) \cdot F(t-T_3) + F(t) \cdot F(t-T_1-T_3) - F(t-T_2) \cdot F(t-T_1-T_3)$$

This is a similar expression to the one obtained for the multiplier output in FIGURE 2, containing four product terms each of which may be integrated and expressed as an autocorrelation coefficient. Thus, the voltage at point H' may be expressed as:

$$V_{H'} = \rho(T_3) - \rho(T_3-T_2) + \rho(T_1+T_3) - \rho(T_1+T_3-T_2) \quad (4)$$

where $$\rho(T_3) = \tfrac{1}{2} \cos 2\pi f(T_3) \cdot \rho_0(T_3) \quad (5)$$

$$\rho(T_3-T_2) = \tfrac{1}{2} \cos 2\pi f(T_3-T_2) \cdot \rho_0(T_3-T_2) \quad (6)$$

$$\rho(T_1+T_3) = \tfrac{1}{2} \cos 2\pi f(T_1+T_3) \cdot \rho_0(T_1+T_3) \quad (7)$$

$$\rho(T_1+T_3-T_2) = \tfrac{1}{2} \cos 2\pi f(T_1+T_3-T_2) \cdot \rho_0(T_1+T_3-T_2) \quad (8)$$

Recalling that $$T_2 = \frac{N}{f}$$

and $T_2=2T_3$ and assuming N is an even number, the above Equations 5 and 6 may be written as:

$$\rho(T_3) = \tfrac{1}{2} \cos 2\pi f\left(\frac{N}{2f}\right) \cdot \rho_0(T_3) = \tfrac{1}{2} \cos N\pi \cdot \rho_0(T_3) = \tfrac{1}{2}\rho_0(T_3) \quad (9)$$

$$\rho(T_3-T_2) = \tfrac{1}{2} \cos 2\pi f\left(\frac{N}{-2f}\right) \cdot$$

$$\rho_0(T_3-T_2) = \tfrac{1}{2} \cos -N\pi \cdot \rho_0(T_3-T_2) = \tfrac{1}{2}\rho_0(T_3-T_2) \quad (10)$$

since the autocorrelation function has even symmetry $\rho(T_3)$ is equal to $\rho(T_3-T_2)$. Thus, $\rho(T_3)$ shown at point 110 in FIGURE 9 and $\rho(T_3-T_2)$ is shown at point 111. These points will remain fixed so long as the aforementioned constrains on $T_2$ and $T_3$ are maintained. This is not difficult to accomplish since such short delay lines are relatively stable. The coefficients $\rho(T_3)$ and $\rho(T_3-T_2)$ will assume minus values if N is an odd integer and points 110 and 111 will fall on negative peaks. But the analysis otherwise is the same.

Recalling that $$T_1 = \frac{M+\tfrac{1}{2}}{f} \text{ and } T_1 = \frac{1}{PRF}$$

and assuming an error in $T_1$ of such that $$fT_1 = M\tfrac{1}{2} + \epsilon$$

where $\epsilon$ is the timing error, then for even values of N Equations 7 and 8 may be written as:

$$\rho(T_1+T_3) = \tfrac{1}{2} \cos 2\pi f\left(\frac{M+\tfrac{1}{2}+\epsilon-N/2}{f}\right) \cdot$$

$$\rho_0(T_1+T_3) = -\tfrac{1}{2} \cos 2\pi\gamma \cdot \rho_0(T_1+T_3) \quad (11)$$

$$\rho(T_1+T_3-T_2) = \tfrac{1}{2} \cos 2\pi f\left(\frac{M+\tfrac{1}{2}+\epsilon-N/2}{f}\right)$$

$$\rho_0(T_1+T_3-T_2) = -\tfrac{1}{2} \cos 2\pi\gamma \cdot \rho_0(T_1+T_3-T_2) \quad (12)$$

In expressions 11 and 12 M and N need not appear because they are whole integers. $\gamma$ is thhe timing error $\epsilon$ expressed in angular form. As with the expressions for Equations 5 and 6, the sign of the above expressions is dependent upon N being of odd or even value. The voltage at point H' in FIGURE 6 accordingly will be:

$$V_{H'} = \tfrac{1}{2}\rho_0(T_3) - \tfrac{1}{2}\rho_0(T_3-T_2) - \tfrac{1}{2} \cos 2\pi\gamma \cdot \rho_0(T_1+T_3)$$
$$+\tfrac{1}{2} \cos 2\pi\gamma \cdot \rho_0(T_1+T_3)$$

or $$V_{H'} = \tfrac{1}{2} \cos 2\pi\gamma[\rho_0(T_1+T_3-T_2) - \rho_0(T_1+T_3)] \quad (13)$$

This servo voltage causes the PRF to adjust and reduce the voltage at H' to zero. For the corrected condition the first term in the above equation, $\rho(T_1+T_3)$, will appear in FIGURE 9 at point 112 and the second term, $$\rho(T_1+T_3-T_2)$$

at point 113.

It can be seen from Equation 13 that with the angular error $\gamma$ maintained in the region of a null by the IF oscillator control circuit, as will be presently explained, the PRF control voltage now depends on the bracketed portion $\rho_0(T_1+T_3-T_2) - \rho_0(T_1+T_3)$. If $T_1$ is not equal to the prescribed interpulse period T of the PRF, the above autocorrelation coefficients will be of unequal values, giving a finite value in the brackets and producing a resultant control voltage at H, similar to the video example. Thus, if $T_1$ is less than T the points 112 and 113 will be shifted to the left on the cosine correlation waveform and will be unsymmetrical around point T. The effect of reducing the error $\gamma$ to zero in the above equation is to place the autocorrelation coefficients on the peaks, or envelope, of the waveform. As long as $\gamma$ is of a value small enough not to invert the polarity of $V_{H'}$, i.e., less than 90°, its effect is not only to weaken this control voltage. However, the effect of $\gamma$ with regard to the IF control voltage is paramount, as will be presently explained.

Considering the IF local oscillator control circuit, the voltage at point I may be expressed as $F(t)+F(t-T_2)$ and the voltage at point J as $F'(t)+F'(t-T_2)$, where $F'(t)$ is equal to $F(t)$ with a 90° phase shift which changes the waveforms to a sine function rather than a cosine function. The voltage at point K is the product of the voltages at point F' and J and may be expressed as $$F'(t) \cdot F(t-T_3) + F'(t-T_2) \cdot F(t-T_3) + F'(t) \cdot F(t-T_1-T_3) + F'(t-T_2) \cdot F(t-T_1-T_3)$$

This expression is integrated by the low-pass filter circuit and the voltage at point L may be written as:

$$V_L = \rho'(T_3) + \rho'(T_3-T_2) + \rho'(T_1+T_3) + \rho'(T_1-T_3-T_2) \quad (14)$$

where $\rho'(\tau)$ is equal to the autocorrelation function $\rho(\tau)$ having its high frequency component shifted in phase by 90° as shown in FIGURE 9 by the dotted curve. Thus, $$\rho'(T_3) = \tfrac{1}{2} \sin 2\pi f(T_3) \cdot \rho_0(T_3) \quad (15)$$

$$\rho'(T_3-T_2) = \tfrac{1}{2} \sin 2\pi f(T_3-T_2) \cdot \rho_0(T_3-T_2) \quad (16)$$

$$\rho'(T_1+T_3) = \tfrac{1}{2} \sin 2\pi f(T_1+T_3) \cdot \rho_0(T_1+T_3) \quad (17)$$

$$\rho'(T_1+T_3-T_2) = \tfrac{1}{2} \sin 2\pi f(T_1+T_3-T_2) \cdot \rho_0(T_1+T_3-T_2) \quad (18)$$

making the same substitutions as before for $T_1$, $T_2$ and $T_3$, we may write $$\rho'(T_3) = \tfrac{1}{2} \sin N\pi \cdot \rho_0(T_3) = 0 \quad (19)$$

$$\rho'(T_3-T_2) = \tfrac{1}{2} \sin -N\pi \cdot \rho_0(T_3-T_2) = 0 \quad (20)$$

$$\rho'(T_1+T_3) = \tfrac{1}{2} \sin 2\pi\gamma \cdot \rho_0(T_1+T_3) \quad (21)$$

$$\rho'(T_1+T_3-T_2) = \tfrac{1}{2} \sin 2\pi\gamma \cdot \rho_0(T_1+T_3-T_2) \quad (22)$$

The voltage at point L in FIGURE 6 accordingly will be:

$$V_L = \tfrac{1}{2} \sin 2\pi\gamma \cdot \rho_0(T_1+T_3) + \tfrac{1}{2} \sin 2\pi\gamma \cdot \rho_0(T_1+T_3-T_2)$$

or $$V_L = \tfrac{1}{2} \sin 2\pi\gamma[\rho_0(T_1+T_3-T_2) + \rho_0(T_1+T_3)] \quad (23)$$

This servo voltage controls the frequency of the local oscillator to change the IF and null out the error signal. For this corrected condition, the second term in the above equation, $\rho'(T_1+T_3)$, will appear in FIGURE 9 at point 114, and the first term, $\rho'(T_1+T_3-T_2)$, at point 115. It is noted that the bracketed expression $$\rho_0(T_1+T_3-T_2)+\rho_0(T_1+T_3)$$

and hence control voltage $V_L$ will have a finite value for all value of $\gamma$ except when $\gamma$ is equated to zero, which reduces $V_L$ to zero. Thus, the quantity $V_L$ is substantially affected by small changes in $\gamma$, since the sine of $\gamma$ goes from plus to minus as $\gamma$ crosses zero. The bracketed quantity, on the other hand, is a large constant having relatively little effect on the control voltage. By servoing the IF oscillator and equating $V_L$ to zero, the relationship $T_1 \cdot f = M + \frac{1}{2}$ is satisfied. In addition, since points 114 and 115 are maintained at zero, points 112 and 113, which are on a curve shifted 90° therefrom, are maintained on the peaks of the cosine waveform, assisting the operation of the PRF control. Thus, the PRF and IF oscillators are simultaneously controlled to provide an effective IF cancellation of the stationary target signals.

As with the system of FIGURE 2, it may be desirable to gate the stationary signals at the inputs or outputs of the multiplier 57 and 63. In addition, it may be necessary to insert a symmetrical amplitude limiter at both the inputs to the multipliers, for example, in the circuits between point F′ and the multipliers A′ and the multipliers. In this manner the control voltages to the IF and PRF oscillators will be dependent solely on the phase of the input signals and independent of the signal strength.

In FIGURE 7 is illustrated a further embodiment of applicant's invention wherein there is provided automatic gain control of the input signals in addition to frequency control. The automatic gain control circuit is applicable to IF cancellation systems and also video cancellation systems of the type employing an amplitude modulation in the ultrasonic delay channel. It is illustrated here with an IF cancellation system, the circuit of FIGURE 7 being identical to that of FIGURE 6 except for the addition of an AGC circuit which controls a variable attenuator and similar components are designated with a prime notation. In order to effect complete cancellation of the stationary target signals, at the point of combination E′, the delayed and undelayed signals in addition to being matched in phase, must also be of the same amplitude. Since the delay line 50 is subject to variations in gain as well as delay, a variable attenuator 67 is inserted in the undelayed channel in FIGURE 7 to provide a maximum cancellation at point E′. The variable attenuator 67 is in the form of T network comprising a thermistor element 68 and a heater element 69 to which the control voltage is applied.

The AGC voltage for the attenuator 67 may be provided by a circuit whose operation is similar to that of the IF oscillator control circuit, including a multipler 70 and long time constant filter circuit 71, said multiplier having one input connected from the output of the summation circuit 61′ and a second input connected from the output of the delay line 53′. This circuit is best analyzed in terms of the autocorrelation function of the signals. However, whereas in the frequency control circuits the gain in the various channels was assumed constant and equal the gain in the delay line 50′ and attenuator 69 will now be considered variable. In accordance with previous notations, but introducing a variable gain, the first voltage input to the multiplier circuit 70 from the summation circuit may be expressed as $$F(t) + T(t-T_2)$$

and the second voltage input as $$F(t-T_3) - KF(t-T_1-T_3)$$

where K is the ratio of the delay line gain to the attenuator gain. The multiplier output is then given by the expression $$F(t) \cdot F(t-T_3) + F(t-T_2) \cdot F(t-T_3) - F(t) \cdot KF(t-T_1-T_3) - F(t-T_2) \cdot KF(t-T_1-T_3)$$

Thus, the voltage at the filter output, point N, may be expressed $$V_N = \rho(T_3) + \rho(T_3-T_2) - K\rho(T_1+T_3) - K\rho(T_1+T_3-T_2) \quad (24)$$

With the IF frequency properly controlled, the autocorrelation coefficients of the above expression will be located on the envelope of the autocorrelation function curve. Therefore, the voltage at point N may be expressed as:

$$V_N = \rho_0(T_3) + \rho_0(T_3-T_2) - K\rho_0(T_1+T_3) - K\rho_0(T_1+T_3-T_2) \quad (25)$$

The sum of the magnitudes of the first two terms in the above expression is made equal to the sum of the magnitudes of the second two terms by adjusting the attenuator gain to equal the delay line gain, thereby equating K to unity. Thus, the four terms in this expression will appear in FIGURE 9 respectively at points 110, 111, 112 and 113. It is noted that a precise equating of the above sum terms is accomplished only if there is no fall off in the maximum amplitudes of the autocorrelation curve. Since there normally is slight fall off, in practice K is maintained extremely close to unit, e.g., .995.

It is noted that the IF and gain control circuits of FIGURE 7 alternatively can be connected from a center tapepd delay line and the summation circuit deleted, as illustrated in FIGURE 8. In this embodiment delay lines 80 and 81, each imparting a delay of $T_2/2$, replace delay line 55′ and the inputs to multiplier 70 and 90° phase shift 62′ is connected from the junction of the delay lines. The output of delay line 81 is connected to difference circuit 56′ in addition to the undelayed signal. The circuit is otherwise shown in FIGURE 7. Thus, the input to the 90° phase shifter 62′ and the multiplier 70 is $F(t-T_3)$. By analyzing the system in terms of the autocorrelation coefficient, as previously, it may be seen that the results of this modified circuitry are analogous to those obtained with the circuit of FIGURE 7. It may be appreciated that a comparable substitution may readily be made in FIGURE 6.

Although in each of the configurations of FIGURES 2, 5, 6 and 7, the mathematical operations of subtraction and summation, which it is noted may each be considered as an algebraic addition, precede the multiplication and integration step, these processes may readily be reversed to perform the same comparison as previously of the different delayed and undelayed signals in terms of the correlation coefficient, although additional circuitry is required. When the algebraic addition is made to follow the multiplication and integration step, the circuitry is modified as follows: In each of the embodiments of FIGURES 2 and 5 an additional multiplier circuit and low-pass filter are employed. The delayed and undelayed signals in the control channel are respectively connected to each of the multiplier circuits as a first input, the second input, as before, connected from point F. The two product terms are integrated and then coupled to the difference circuit from which the PRF control signal is obtained. Similarly, in FIGURE 6, two additional multiplier circuits, two low-pass filter circuits and one 90° phase shifter must be employed. The delayed and undelayed signals, in the control circuit, are each connected through a 90° phase shifter to a multiplier circuit, the outputs thereof being integrated and summated to provide the IF control signal. In FIGURE 7 there is further required another sum circuit to which are applied the same inputs as to the difference circuit, for providing the AGC control signal.

While certain embodiments of the invention have been shown and described, it should be understood that the invention is not limited thereto but is applicable to additional systems wherein are derived a plurality of periodically repeated, randomly spaced, similarly shaped pulsed waveforms, and also single periodic pulsed waveforms, for correlating the repeated pulsed waveforms. It is intended that all modifications that fall within the true spirit and scope of the invention be claimed in the appended claims.

What I claim as new and desire to secure by Letters Patent of the United States is:

1. In a pulse transmission system employing a long time delay in the receiver circuit wherein it is required that an oscillator within the system be maintained at a frequency of a period having a fixed relationship to said long time delay, a correlation control circuit comprising means for deriving a first signal containing a plurality of periodic, similarly shaped pulsed waveforms having a repetition frequency related to that of said oscillator, first means for delaying said first signal by a period equal to less than said long time delay to provide a first delayed signal, second delay means for delaying said first signal by a period equal to said long time delay plus a period of one half the delay of said first delay means to provide a second delayed signal, comparison means for deriving first and second electrical quantities indicative respectively of the time relationship of the pulsed waveforms between said first signal and said second delayed signal, and of the time relationship of the pulsed waveforms between said first delayed signal and said second delayed signal, and means responsive to said first and second electrical quantities to correct said oscillator frequency to have said fixed relationship.

2. In a pulse transmission system as in claim 1 wherein said comparison means includes means for algebraically adding said first signal and said first delayed signal and multiplier means for multiplying the algebraically summated signals by said second delayed signal.

3. In a pulse transmission system as in claim 1 wherein said comparison means includes means for multiplying said first signal by said second delayed signal to provide a first product signal and for multiplying said first delayed signal by said second delayed signal to provide a second product signal and means for algebraically adding said first and second product signals.

4. In a pulse transmission system as in claim 1 wherein said oscillator is maintained at a frequency having a period integrally related to said long time delay.

5. In a pulse transmission system as in claim 1 wherein said oscillator is maintained at a frequency such that an odd number of half periods of said frequency is equal to said long time delay.

6. In a transmission system, means for deriving a first signal of periodically repeated, randomly spaced, similarly shaped waveforms, a long delay means for delaying said first signal to provide a long delayed signal, a correlation control circuit for maintaining the delay of said long delay means equal to the repetition period of said periodically repeated waveforms comprising first short delay means for delaying said first signal by a period less than twice the duration of each waveform, second short delay means for delaying said long delayed signal by a period equal to one half the time delay of said first short delay means, comparison means for deriving and comparing first and second electrical quantities indicative respectively of the period of coincidence between said first signal and the output of said second short delay means and of the period of coincidence between the outputs of said first and second short delay means, and means responsive to inequalities in said first and second electrical quantities for maintaining the requisite delay equality.

7. In a transmission system as in claim 6 wherein the first short delay means provides a delay approximately equal to the duration of each of the repeated waveforms.

8. In a transmission system, means for deriving a first intermediate frequency signal of periodically repeated, randomly spaced, similarly shaped waveforms, a long delay means for delaying said first signal to provide a long delayed signal, a correlation control circuit for maintaining the delay of said long delay means equal to an integral number of half periods of said intermediate frequency such that the input and output of said long delay means have a fixed phase relationship with respect to each other comprising first short delay means for delaying said first signal by a period less than twice the duration of each waveform, second short delay means for delaying said long delayed signal by a period equal to one half the time delay of said first short delay means, comparison means for deriving first and second electrical quantities indicative respectively of the phase quadrature component between said first signal and the output of said second short delay means and of the phase quadrature component between the outputs of said first and second short delay means, and means responsive to said first and second electrical quantities for maintaining the requisite delay equality.

9. In a transmission system as in claim 8 wherein the first short delay means provides a delay approximately equal to the duration of each of the repeated waveforms.

10. In a transmission system, means for deriving a first intermediate frequency signal of periodically repeated, randomly spaced, similarly shaped waveforms, a long delay means for delaying said first signal, a correlation control circuit for maintaining the delay of said long delay means equal to an integral number of half periods of said intermediate frequency such that the input and output of said long delay means have a fixed phase relationship with respect to each other comprising first delay means for delaying said first signal by a period less than the duration of each waveform to provide a first delayed signal, second short delay means for delaying said long delayed signal and said first signal by a period equal to the period of said first delay means to provide respectively second and third delayed signals, comparison means for deriving first and second electrical quantities indicative respectively of the phase quadrature component between said first delayed signal and said second delayed signal and the phase quadrature component between said first delayed signal and said third delayed signal and means responsive to said first and second electrical quantities for maintaining the requisite delay equality.

11. In a pulse radar system employing a long time delay in the receiver circuit wherein it is required that an integral number of the pulse repetition periods of the transmitted pulses be maintained equal to said long time delay, a correlation control circuit comprising means for deriving a first signal containing a plurality of stationary target signal returns of said transmitted pulses, first delay means for delaying said first signal by a period of less than twice said pulse width to provide a first delayed signal, means for subtracting said first signal and said first delayed signal to obtain a difference signal, second delay means for delaying said first signal by a period equal to said long time delay plus a period of one half the time delay of said first delay means to provide a second delayed signal, means for multiplying said difference signal by said second delayed signal to obtain a product signal, means for integrating said product signal to obtain an error signal whose sign and magnitude is indicative of the difference in time between said pulse repetition period and said long time delay, and means for correcting said pulse repetition period in accordance with said error signal.

12. In a pulse radar moving target indication system employing an ultrasonic delay line in a cancellation circuit of the receiver wherein it is required that the time delay of said ultrasonic delay line be equal to the pulse repetition period of the transmitted pulses, a correlation control circuit comprising means for deriving a first signal containing a plurality of stationary target signal returns of said transmitted pulses, first delay means for delaying said first signal by a period of less than twice the pulse width to provide a first delayed signal, means for subtracting said first signal and said first delayed signal to obtain a difference signal, means for coupling said first signal to said ultrasonic delay line, second delay means for delaying the output from said ultrasonic delay line by a period equal to one half the time delay of said first delay means to provide a second delayed signal, means for multiplying said difference signal by said second delayed signal to obtain a product signal, means for integrating said product signal to obtain an error signal whose sign and magnitude are indicative of the difference in time between said pulse repetition period and said ultrasonic delay, and means responsive to said error signal for correcting said pulse repetition period.

13. In a pulse radar moving target indication system as in claim 12 wherein the pulse repetition period is provided by a transmitter trigger oscillator and the means for correcting said pulse repetition period comprises an automatic frequency control circuit coupled to the transmitter trigger oscillator.

14. In a pulse radar moving target indication system as in claim 12 wherein the ultrasonic delay line is in the intermediate frequency stage of the receiver and wherein said first signal is an intermediate frequency signal, there being an additional requirement that the time delay of said ultrasonic delay line by equal to an odd number of half periods of said intermediate frequency, said correlation control circuit additionally comprising means for adding said intermediate frequency signal and said first delayed signal to obtain a summation signal, means for shifting the phase of said summation signal by 90°, second multiplier means for multiplying said phase shifted summation signal by the second delayed signal to obtain a second product signal, second integrating means for integrating said second product signal to obtain a second error signal whose sign and magnitude are indicative of the difference in time between an odd number of half periods of the intermediate frequency and said ultrasonic delay, and means responsive to said second error signal for correcting said intermediate frequency.

15. In a pulse radar moving target indication system as in claim 14 wherein said means for correcting the intermediate frequency comprises an automatic frequency control circuit coupled to an intermediate frequency local oscillator in said system.

16. In a pulse radar moving target indication system as in claim 14 wherein there is provided in said cancellation circuit a variable attenuator for attenuating said first signal, there being an additional requirement that the attenuated signal and the ultrasonically delayed signal be of approximately equal amplitude, said correlation control circuit additionally comprising a third multiplier means for multiplying said summation signal by the second delayed signal to obtain a third product signal, third integrating means for integrating said third product signal to obtain a third error signal whose sign and magnitude are indicative of inequality in the amplitudes of said attenuated and said ultrasonically delayed signals, and means responsive to said third error signal for correcting the attenuation of said first signal.

17. In a pulse radar moving target indication system as in claim 16 wherein said first delay means provides a delay of approximately the pulse width of said transmitted pulses.

18. In a pulse radar moving target indication system as in claim 17 wherein said integrating means comprises low-pass filter networks.

19. In a pulse radar moving target indication system as in claim 12 wherein the ultrasonic delay line is in the intermediate frequency stage of the receiver and wherein said first signal is an intermediate frequency signal, there being an additional requirement that the time delay of said ultrasonic delay line be equal to an odd number of half periods of said intermediate frequency, said correlation control circuit additionally comprising a 90° phase shifter, means for coupling to said phase shifter from a center tapped position of said first delay means a third delayed signal which is delayed by a period equal to one half the time delay of said first delay means, second multiplier means for multiplying the output signal from said 90° phase shifter by said second delayed signal to obtain a second product signal, second integrating means for integrating said second product signal to obtain a second error signal indicative of the difference in time between an odd number of half periods of the intermediate frequency and said ultrasonic delay, and means responsive to said second error signal for correcting said intermediate frequency.

20. A pulse radar moving target indication system as in claim 19 wherein there is provided in said cancellation circuit a variable attenuator for attenuating said first signal and it is required that the attenuated signal and the ultrasonically delayed signal be of approximately equal amplitude, said correlation control circuit additionally comprising a third multiplier means for multiplying said third delayed signal by said second delayed signal to obtain a third product signal, third integrating means for integrating said third product signal to obtain a third error signal indicative of the difference in said amplitudes, and means responsive to said third error signal for adjusting said variable attenuator to provide the requisite amplitude equality.

21. In a pulse transmission system employing a long time delay in the receiver circuit wherein it is required that an oscillator within the system be maintained at a frequency of a period having a fixed relationship to said long time delay, a correlation control circuit comprising means for deriving a first signal containing a plurality of periodic, similarly shaped waveforms having a repetition frequency related to that of said oscillator, first means for delaying said first signal by a period less than said long time delay to provide a first delayed signal, second delay means for delaying said first signal by a period equal to said long time delay plus a period of one half the delay of said first means to provide a second delayed signal, and means responsive to said first signal, said first delayed signal and said second delayed signal for providing an error signal which is a function of deviation from said fixed relationship.

22. In a transmission system, means for deriving a first intermediate frequency ssignal of periodically repeated, randomly spaced, similarly shaped waveforms, a long delay means for delaying said first signal to provide a long delayed signal, a correlation control circuit for maintaining the delay of said long delay means equal to an integral number of half periods of said intermediate frequency such that the input and output of said long delay means have a fixed phase relationship with respect to each other comprising first short delay means for delaying said first signal by a period less than the time delay of said long delay means to provide a first delayed signal, second short delay means for delaying said long delayed signal by a period equal to one half the time delay of said first short delay means to provide a second delayed signal, and means responsive to said first signal, said first delayed signal and said second delayed signal for providing an error signal which is a function of deviation from said fixed phase relationship.

References Cited

UNITED STATES PATENTS 3,109,171 10/1963 Henry et al. _____ 343—7.7
3,161,874 12/1964 Page _____ 343—7.7

RODNEY D. BENNETT, JR., Primary Examiner
H. C. WAMSLEY, Assistant Examiner

U.S. Cl. X.R.

235—181; 343—100